United States Patent [19]

Aulick et al.

[11] Patent Number: 5,198,022
[45] Date of Patent: Mar. 30, 1993

[54] WATERFAST DYE AND AQUEOUS INK

[75] Inventors: Rodney O. Aulick; Bradley L. Beach; Donald L. Elbert; Terence E. Franey, all of Lexington, Ky.; James F. Feeman, Wyomissing, Pa.; John M. Olson, Boulder, Colo.; Allen C. Sanders, Winchester, Ky.; Robert L. Vollmer, Boulder, Colo.

[73] Assignee: Lexmark International, Inc., Greenwich, Conn.

[21] Appl. No.: 822,251

[22] Filed: Jan. 17, 1992

Related U.S. Application Data

[63] Continuation-in-part of Ser. No. 782,684, Oct. 25, 1991, abandoned.

[51] Int. Cl.⁵ .............................................. C09D 11/02
[52] U.S. Cl. .................................. 106/22 K; 534/810; 534/811; 534/812; 534/815; 534/829; 534/836; 534/837
[58] Field of Search .............. 106/22, 22 K; 534/680, 534/810, 811, 812, 815, 829, 836, 837

[56] References Cited

U.S. PATENT DOCUMENTS

| | | | |
|---|---|---|---|
| 1,365,040 | 1/1921 | Leaming | 534/836 |
| 1,913,382 | 6/1933 | Gubelmann et al. | 534/811 |
| 2,112,920 | 6/1934 | Mendoza et al. | 534/810 |
| 2,193,729 | 3/1940 | Krobser | 534/836 |
| 2,227,546 | 1/1941 | Krebser | 534/812 |
| 2,265,425 | 10/1940 | Fischer et al. | 534/829 |
| 3,891,581 | 6/1975 | Argenio | 106/22 |
| 4,083,840 | 4/1978 | Schoefberger | 534/829 |
| 4,097,476 | 6/1978 | Wicki | 534/810 |
| 4,143,035 | 3/1979 | Stingl | 534/829 |
| 4,255,327 | 3/1981 | Brode | 534/836 |
| 4,557,761 | 12/1985 | Kobayashi et al. | 534/837 |
| 4,594,410 | 6/1986 | Pedrazzi | 534/701 |
| 4,626,284 | 12/1986 | Ohta et al. | 106/22 |
| 4,724,001 | 2/1988 | Ohta et al. | 106/22 |
| 4,737,240 | 4/1988 | Davis et al. | 534/680 |
| 4,752,337 | 6/1988 | Kunde | 106/22 |
| 4,841,037 | 6/1989 | Ohta et al. | 534/815 |
| 4,963,189 | 10/1990 | Hindagolla | 106/22 |
| 5,017,644 | 5/1991 | Fuller et al. | 524/612 |
| 5,034,017 | 7/1991 | Kunde et al. | 106/22 |
| 5,053,495 | 10/1991 | Greenwood et al. | 534/829 |
| 5,055,566 | 10/1991 | Gregory et al. | 534/228 |
| 5,062,893 | 11/1991 | Adamic et al. | 106/22 |
| 5,082,496 | 1/1992 | Yamamoto et al. | 106/22 |

FOREIGN PATENT DOCUMENTS

| | | |
|---|---|---|
| 0356080 | 8/1989 | European Pat. Off. |
| 725224 | 9/1942 | Fed. Rep. of Germany |
| 60-243157 | 12/1985 | Japan |
| 60-243176 | 12/1985 | Japan |
| 64-79277 | 3/1989 | Japan |
| 1313568 | 12/1989 | Japan |
| 614458 | 11/1979 | Switzerland |
| 418454 | 11/1934 | United Kingdom |

*Primary Examiner*—Karl Group
*Assistant Examiner*—Helene Klemanski
*Attorney, Agent, or Firm*—John A. Brady

[57] ABSTRACT

A alkali-soluble dye for a waterfast ink having structural formula as follows:

and an ink containing the dye dissolved in water. Printing from the ink is insoluble below pH 6.0; is an intense black at low concentration; and remains black on acid papers. The aqueous inks are stable and exhibit good printhead nozzle maintenance.

39 Claims, No Drawings

WATERFAST DYE AND AQUEOUS INK

RELATED APPLICATION

This is a continuation in part of U.S. patent application Ser. No. 07/782,684, filed Oct. 25, 1991 now abandoned, entitled Waterfast Dye and Aqueous Ink.

TECHNICAL FIELD

This invention relates to dyes for use in aqueous, waterfast inks and to aqueous inks containing such dyes. Such inks may be printed or otherwise applied in any manner, but typically are applied by drop on demand printing.

BACKGROUND OF THE INVENTION

The dye molecule of this invention when applied to ordinary paper is highly waterfast against ordinary water and highly color-stable on basic paper. Since the dye is soluble in water having basic pH, an aqueous ink is achieved by formulas combining the dye and ammonia, as conventional for base-soluble dyes.

A number of dyes having similar, but not the same, structural formulas, are known and are found in the following list of references. However, no dye is known which provides the same excellent waterfastness and color fidelity as the dye of this invention when printed as a single ingredient on ordinary paper. The mechanism is not understood since similar molecules lack color fidelity significantly when applied to acid papers. The references are the following: U.S. Pat. No. 4,963,189 to Hindagolla; U.S. Pat. No. 4,841,037 to Ohta et al; U.S. Pat. No. 4,626,284 to Ohta et al; U.S. Pat. No. 4,594,410 to Pedrazzi; U.S. Pat. No. 4,143,035 to Stingl; U.S. Pat. No. 4,083,840 to Schoefberger; U.S. Pat. No. 2,265,425 to Fischer et al; U.S. Pat. No. 2,227,546 to Krebser; U.S. Pat. No. 2,112,920 to Mendoza; U.S. Pat. No. 1,913,382 to Gubelmann et al; U.S. Pat. No. 1,365,040 to Leaming; and U.S. Pat. 2,193,729 to Krebser; European Patent Application 356,080, application number 89308157.0, filed Aug. 10, 1989; German Patentschrift No. 725,224, dated Sep. 17, 1942; Great Britain No. 418,454; dated Nov. 22, 1934; Japanese patents/applications 1-313,568 dated Dec. 19, 1989; 64-79,277 dated Mar. 24, 1989; 60-243,176 dated Dec. 3, 1985; 60-243,157 dated Dec. 3, 1985; and Swiss Patentschrift 614,458 dated Nov. 30, 1979.

Rendering a base-soluble material soluble by including ammonium hydroxide in an aqueous ink is a conventional technique. Illustrative teachings are U.S. Pat. Nos. 3,891,581 to Argenio; Example XIII; found on column 13, of U.S. Pat. No. 5,017,644 to Fuller; and the foregoing U.S. Pat. No. 4,963,189 and European 356,080 (these two references have much identical content).

DISCLOSURE OF THE INVENTION

This invention is a dye of the following structural formula which provides waterfast inks when dissolved in solvents comprising an aqueous or equivalent polar solvent mixture (e.g. water and alcohol mixture) and ammonia.

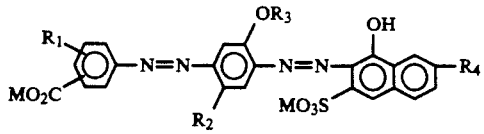

wherein;
$R_1$ is —H, —$CO_2M$, $CH_3$, —$OR_3$, Cl;
$R_2$ is -lower alkyl having 1–4 C atoms, lower alkoxy having 1–4 C atoms, —$CH_2CO_2M$
$R_3$ is -lower alkyl having 1–4 C atoms,
$R_4$ is —$NH_2$, —$NHR_3$, —$NHCH_2CO_2H$,

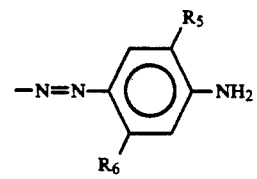

$R_5$ is —H, -lower alkyl having 1–4 C atoms, —$CO_2M$;
M is H, $NH_4$; Na, K, Li and wherein the total number of —$CO_2M$ groups is 1 to 3;
$R_6$ is —H, —$NH_2$, These dyes in the form of inks for drop-on-demand jet printing exhibit all the necessary properties for producing waterfast printed characters by the mechanism described in this disclosure: 1) they become water insoluble below pH 6.0; 2) they produce intense black characters at only 2% dye concentration in the ink; 3) they are stable in aqueous ink formulations; and, 4) they do not clog the small orifices during non-use, thus providing good printhead maintenance when used for drop on demand printing. Satisfactory inks have at least 1% by weight of the dye and at least 2% by weight of cosolvent.

Moreover, these dyes have the added property of remaining black when printed on acid paper. Many black dyes turn brown on acid papers.

BEST MODE FOR CARRYING OUT THE INVENTION

The preferred dye of this invention has the structural formula:

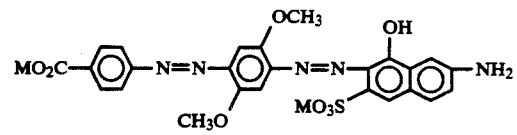

Wherein M is —H, —$NH_4$, —Li, —Na, —K
The preferred ink formula is as follows:

| Ingredient | Weight in Grams |
| --- | --- |
| Foregoing Dye (acid form) | 2 |
| 2-Pyrrolidone | 5 |
| Sodium Phosphate | 0.1 |
| Water & 2N Ammonium Hydroxide to Bring pH to 8.6 | 92.9 |
| Total | 100.0 |

The ingredients readily dissolve with stirring: The pyrrolidone is a standard humectant or cosolvent to maintain the solubility of the dye. The sodium phosphate tends to prevent clogging of printhead nozzles during periods of inactivity.

The foregoing dye was selected because of its excellent maintenance (no clogging of ink jet nozzle during shutdown) coupled with excellent waterfastness and excellent color density.

Waterfastness of printings from the preferred ink is 97% to ordinary water which is pH neutral, or to acidic water. Waterfastness is measured by controlled soaking in water of paper printed with the ink. The percent waterfastness is the percent of optical density retained after a five minute soak in deionized water, observed, for example, by an optical densitometer.

Alternative Dyes and Their Fabrication

EXAMPLE 1

The dye having the formula:

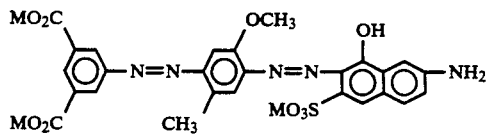

Step 1

5-Amino-isophthalic acid (9.64 g, 0.05 mole) was stirred in water (80 ml) and the pH adjusted to 9.0 with 2N NaOH. 2N NaNO$_2$ solution (26.8 ml) was added with continued stirring. The solution (pH>9.0) was slowly added to a mixture of water (50 ml) and 38% HCl (27 ml). The mixture was maintained at 40°-50° C. and stirred for 30 minutes. Excess nitrous acid was removed by adding a saturated solution of sulfamic acid.

Cresidine (6.39 g, 0.05 mole) was dissolved in 25 ml of water and 38% HCl (5 ml). Solution was cooled to <5° C. with ice. The cold (<10° C.) diazo solution was added to the cresidine solution and the pH raised to 2.8 with 2N NaOH, with good stirring. The pH was maintained at 3.3-3.5 with sodium acetate solution. The temperature was maintained at <10° C. and the mixture stirred for 20 hours. The coupling mixture then was made alkaline with 2N NaOH to pH 8.0, producing an orange colored solution.

Step 2

2N NaNO$_2$ (31 ml) was added to the solution from Step 1 and the temperature was adjusted to less than 10° C. by adding ice. 38% HCl (31 ml) was added rapidly with stirring and the temperature maintained at <5° C. The solution was stirred overnight. Excess nitrous acid was removed by adding a saturated solution of sulfamic acid. Gamma acid (13.54 g, 0.05 mole) was placed in 80 ml of water and the pH was adjusted to 9.0 by adding 20 g of Na$_2$CO$_3$ and 37 ml of 2N NaOH. The diazo was added to the gamma acid solution and a 20% Na$_2$CO$_3$ solution was added simultaneously to maintain the pH at >9. Ice was added to maintain the temperature at 5° C. Coupling was rapid to precipitate black dye in the form of its Na salt. Acidification gave precipitate in the free acid form, which was filtered and washed with dilute aqueous acid. This product was formulated as an ink, and used in a drop-on-demand printer as described in Example 7, giving excellent results.

EXAMPLE 2

The dye having the formula:

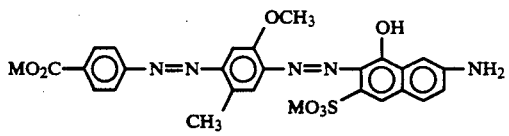

p-Aminobenzoic acid (6.92 g., 0.05 mole) was diazotized conventionally and coupled with an equivalent amount of cresidine as in Example 1. The amino group of the mono-azo intermediate thus formed was diazotized, also as in Example 1, and coupled similarly at pH 9 with an equivalent amount of gamma acid to produce the black dye as the sodium salt. This was converted to the free acid form by acidification, filtration and washing with dilute aqueous acid. The resultant dye was formulated as in ink and gave excellent results when tested as described in Example 7.

EXAMPLE 3

The dye of structural formula:

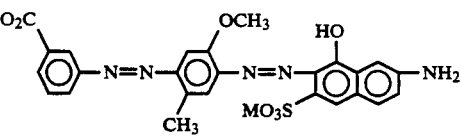

m-Aminobenzoic acid (6.92 g 0.05 mole) was diazotised conventionally and coupled to cresidine. The 1-diazo-2-methoxy-5-methyl-4-(3-carboxy phenylazo) benzene was coupled to gamma acid by the method of Example 1. Results of testing are given in Example 7.

EXAMPLE 4

The dye of structural formula:

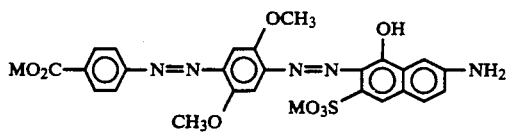

p-Aminobenzoic acid (6.92 g, 0.05 mole) was diazotized conventionally at 0°-5° C. in aqueous solution.

2,5-dimethoxy aniline (7.8 g, 0.05 mole) was dissolved in 80 ml of water and 38% HCl (20 ml). The solution was cooled to <5° C. and the diazo added. The pH was raised to 4.0 and maintained with 2N NaOH with stirring for 16 hours. The pH was then raised to 10. 2N NaNO$_2$ (28 ml) was added. 38% HCl (28 ml) was added rapidly and the solution stirred at room temperature for 4 hours. The crystalline diazo was filtered.

Gamma acid (13.6 g, 0.05 mole) was dissolved in 80 ml of water at pH 9.0 using Na$_2$CO$_3$. The diazo paste was added and the coupling was stirred for 3 hours. The dye was then precipitated by adjusting the pH to 5.0 with acetic acid. The precipitate was filtered and washed with 5% acetic acid, giving the free acid form of the dye. This was formulated as an ink and tested as described in Example 7 with excellent results.

EXAMPLE 5

The dye of structural formula:

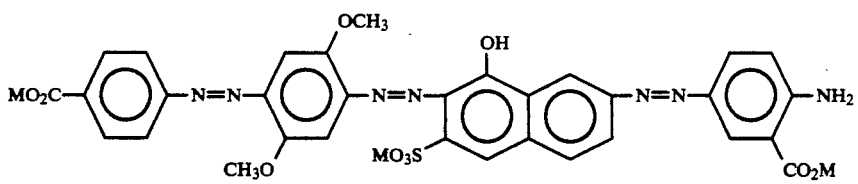

The dye from Example 4 was dissolved in 600 ml of water and the pH adjusted to 9.0 with 2N NaOH. 2N NaNO$_2$ (28 ml) was added and the solution cooled to <5° C. 38% HCl (28 ml) was added and the solution stirred for 3 hours with the temperature maintained at less than 10° C. Excess nitrous acid was removed with sulfamic acid. Anthranilic acid (7 g, 0.05 mole) was dissolved in 80 ml of water and 15 ml of 38% HCl. The anthranilic acid solution was added to the diazo slurry and the mixture was stirred for 15 minutes. The diazo-/anthranilic acid mixture was added to 240 ml of chilled 20% Na$_2$CO$_3$ solution and stirred overnight at pH approximately 7. The pH of the solution was lowered to 5.6 with acetic acid and the dye precipitated. The precipitate was filtered and washed with 5% acetic acid giving the free acid form of the dye. The dye was formulated as in ink and tested as described in Example 7 with excellent results.

EXAMPLE 6

The dye of structural formula:

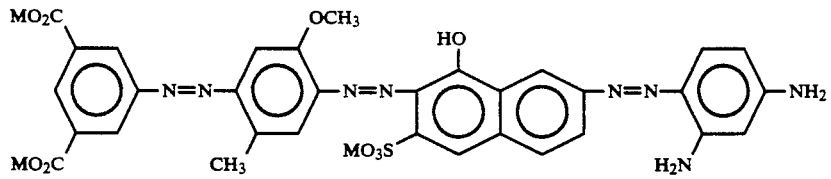

The dye from Example 1, 0.05 mole was dissolved in 600 ml of water at pH 9.0 with 2N NaOH. Then 2N NaNO$_2$ (28 ml) was added. The solution was cooled to <5° C., and 28 ml of 38% HCl rapidly added. The diazotization mixture was stirred for 4 hours. Excess nitrous acid was removed by adding sulfamic acid. m-Phenylene-diamine (5.5 g, 0.05 mole) was dissolved in 80 ml of water with 38% HCl (15 ml). The m-phenylene diamine solution was added to the diazo solution and cooled to 5° C. 240 ml of 20% Na$_2$CO$_3$ solution was iced to 5° C., the diazo/m-phenylene diamine mixture added to the carbonate solution. After stirring for 2 hours, the pH was 7.5. The pH was raised to 8.5 with NaOH solution. The pH was lowered to 5.5 with acetic acid and the dye filtered. Washing with 5% acetic acid gave the free acid form of the dye which was tested as described in Example 7.

EXAMPLE 7

PRINTING TESTS

A table of the waterfastness and non-clogging of the printhead nozzles with inks prepared using the dyes of Examples 1-6 is given below. Nozzles of a conventional drop on demand ink jet printer are left uncapped for six hours and then operated to determine clogging.

TABLE A

| Dye Example | % Waterfastness | % of Nozzles Recovered after uncapped aging |
| --- | --- | --- |
| 1 | 92 | 94 |
| 2 | 90 | 100 |
| 3 | 97 | 100 |
| 4 | 87 | 100 |
| 5 | 100 | 28 |
| 6 | 86 | 94 |

Example 4 was chosen as the best mode because of health and safety concerns with regard to the use of cresidine to make Examples 2 and 3.

Waterfastness is measured by controlled soaking in water of paper printed with the ink. The percent waterfastness is the percent of optical density retained after a five minute soak in deionized water, observed, for example, by an optical densitometer.

All of the dyes of the foregoing examples are intense black dyes soluble in water at basic pH. They maintain color fidelity even on basic paper. Because of their intensity, ink formulas having about 2 percent by weight of dye, function well for ink jet printing with excellent waterfastness. The waterfastness achieved is a function of the paper or other substrate and of ordinary water being at neutral or acidic pH. Thus, the dye is insoluble at the pH of the test water applied to the printing and it remains in place as printing.

We claim:

1. A dye of the structural formula:

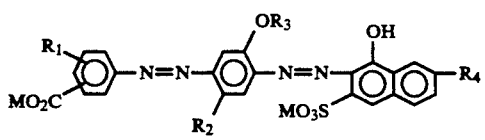

where;

R$_1$ is —H, —CO$_2$M, —CH$_3$, —OR$_3$, Cl;

R$_2$ is -lower alkyl having 1-4 C atoms, -lower alkoxy having 1-4 C atoms, —CH$_2$CO$_2$M;

R$_3$ is -lower alkyl having 1-4 C atoms,

R$_4$ is —NH$_2$, —NHR$_3$, —NHCH$_2$CO$_2$H,

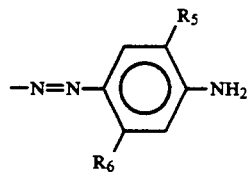

R₅ is —H, —CO₂M;
R₆ is —H, —NH₂ and, when R₅ is —H, R₆ is —NH₂, R₂ is lower alkyl or lower alkoxy, and R₁ is —OC₂M, —CH₃, —OR₃, Cl,
M is H, NH₄, Na, K, Li
and wherein the total number of —CO₂M groups is 1 to 3.

2. A waterfast ink comprising at least 1% by weight of a dye of claim 1 dissolved in a polar vehicle as the ammonium salt.

3. The ink of claim 2 in which the dye is of the structural formula:

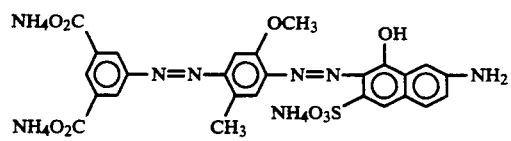

4. The dye of claim 1 of the structural formula:

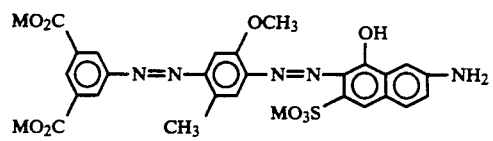

5. The dye of claim 1 of structural formula:

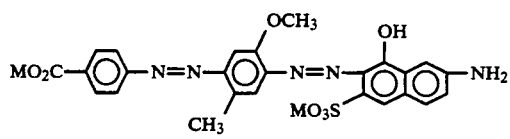

6. The ink of claim 2 in which the dye is of structural formula:

7. The dye of claim 1 of structural formula:

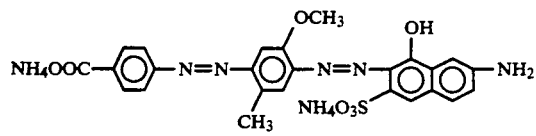

8. The ink of claim 2 in which the dye is of structural formula:

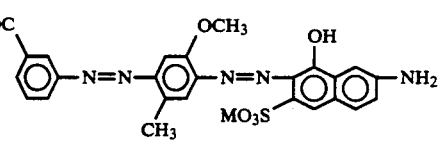

9. The dye of claim 1 of structural formula:

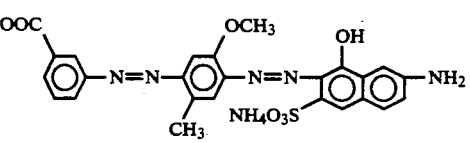

10. The ink of claim 2 in which the dye is of structural formula:

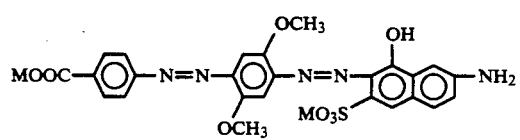

11. The dye of claim 1 of structural formula:

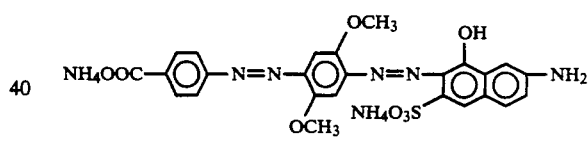

12. The ink of claim 2 in which the dye is of structural formula:

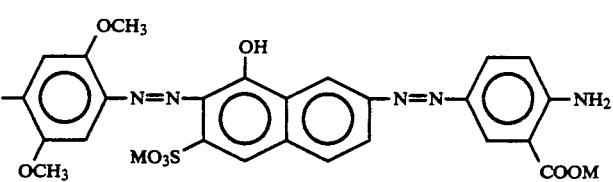

13. The dye of claim 1 of structural formula:

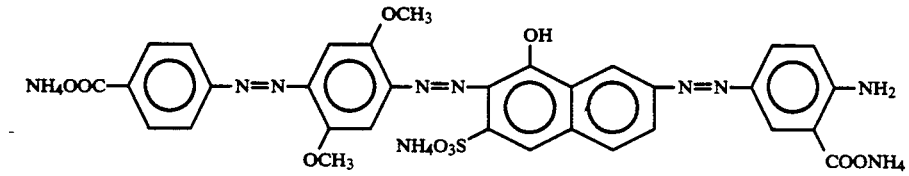

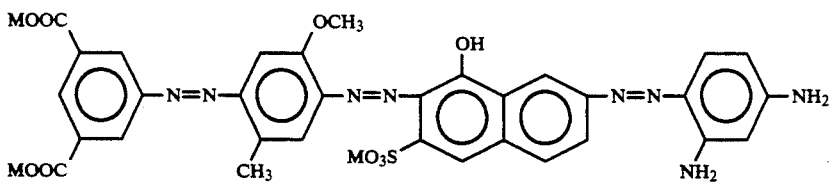

14. The ink of claim 2 in which the dye is of structural formula:

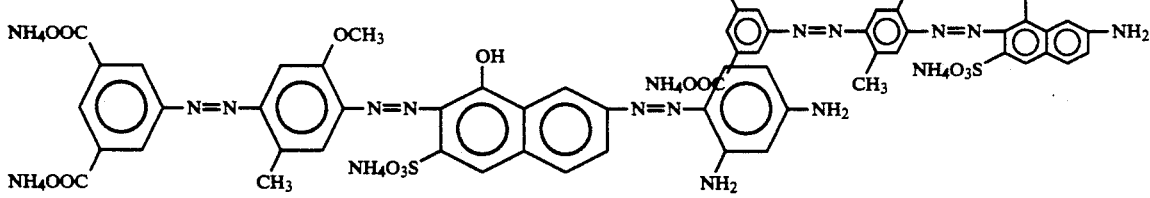

15. A waterfast ink comprising by weight:
(a) at least 1% of dye of the structural formula:

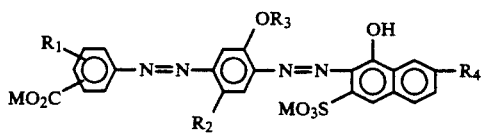

where;
$R_1$ is —H, —$CO_2M$, —$CH_3$, —$OR_3$, Cl;
$R_2$ is -lower alkyl having 1-4 C atoms, -lower alkoxy having 1-4 C atoms, —$CH_2CO_2M$;
$R_3$ is -lower alkyl having 1-4 C atoms,
$R_4$ is —$NH_2$, —$NHR_3$, —$NHCH_2CO_2H$,

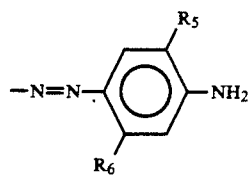

$R_5$ is —H, -lower alkyl having 1-4 C atoms, —$CO_2M$;
$R_6$ is —H, —$NH_2$;
M is H, $NH_4$, Na, K, Li
and wherein the total number of —$CO_2M$ groups is 1 to 3;
(b) at least 2% of a cosolvent, and
(c) water and ammonium ion bringing said ink to an alkaline pH sufficient to dissolve said dye in said ink.

16. The ink as in claim 15 in which said cosolvent is 2-pyrrolidone.

17. The ink as in claim 16 in which said dye is

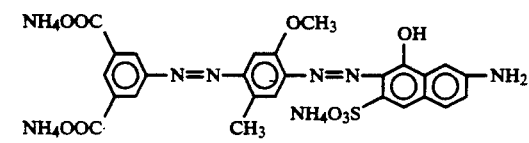

18. The ink as in claim 15 in which said dye is

19. The ink as in claim 15 in which said dye is

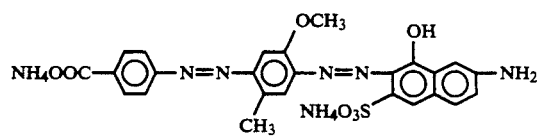

20. The ink as in claim 16 in which said dye is

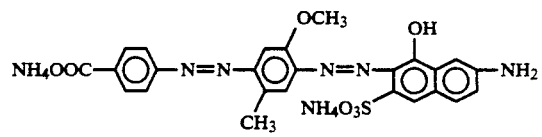

21. The ink as in claim 15 in which said dye is

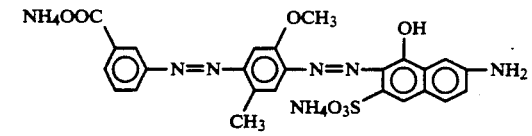

22. The ink as in claim 16 in which said dye is

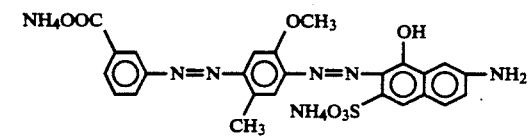

23. The ink as in claim 15 in which said dye is

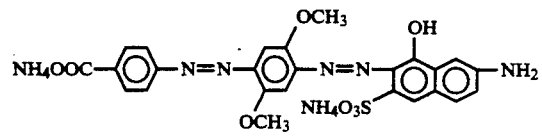

24. The ink as in claim 16 in which said dye is

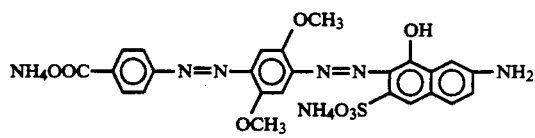

25. The ink as in claim 15 in which said dye is

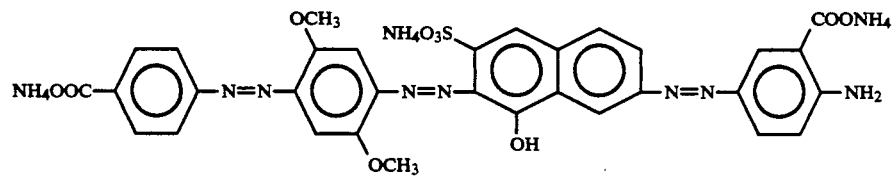

26. The ink as in claim 16 in which said dye is

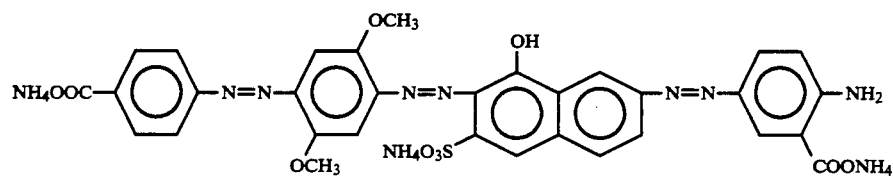

27. The ink as in claim 15 in which said dye is

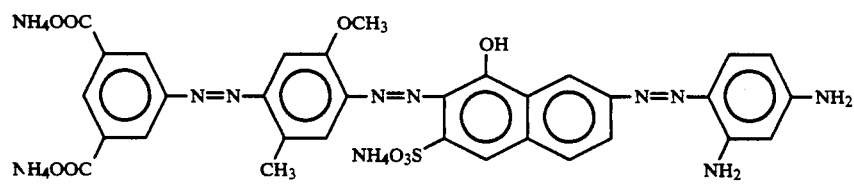

28. The ink as in claim 16 in which said dye is

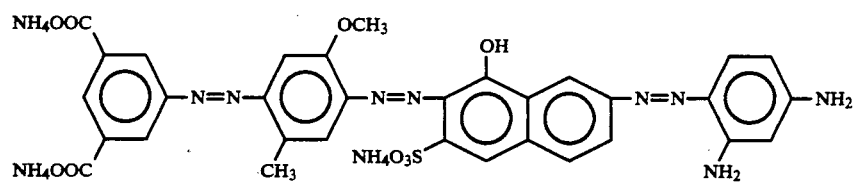

29. The ink as in claim 15 in which said dye is about 2% by weight of said ink.

30. The ink as in claim 18 in which said dye is about 2% by weight of said ink.

31. The ink as in claim 19 in which said dye is about 2% by weight of said ink.

32. The ink as in claim 21 in which said dye is about 2% by weight of said ink.

33. The ink as in claim 23 in which said dye is about 2% by weight of said ink.

34. The ink as in claim 25 in which said dye is about 2% by weight of said ink.

35. The ink as in claim 27 in which said dye is about 2% by weight of said ink.

36. The ink as in claim 24 in which said dye is about 2% by weight of said ink.

37. The ink as in claim 36 in which said pH is about 8.6.

38. The ink as in claim 23 in which said pH is about 8.6.

39. The ink as in claim 37 in which said 2-pyrrolidone is about 5% by weight of said ink.

* * * * *